United States Patent
Assar et al.

(10) Patent No.: US 7,291,994 B2
(45) Date of Patent: Nov. 6, 2007

(54) SYSTEM AND METHOD FOR ESTABLISHING SPINDLE MOTOR CURRENT DURING COLD TEMPERATURE OPERATION OF HDD

(75) Inventors: Farzin Assar, San Jose, CA (US); Lee Duyly Nguyentran, San Jose, CA (US); Phong Van Vu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/344,326

(22) Filed: Jan. 30, 2006

(65) Prior Publication Data

US 2007/0176569 A1    Aug. 2, 2007

(51) Int. Cl.
*H02K 21/00*    (2006.01)

(52) U.S. Cl. ............... 318/254; 318/138; 318/439; 318/729; 318/812

(58) Field of Classification Search .......... 318/254, 318/138, 439, 729, 812, 778, 798, 806, 800, 318/799, 809, 634, 783, 471; 388/934
See application file for complete search history.

(56) References Cited

U.S. PATENT DOCUMENTS

| | | | |
|---|---|---|---|
| 4,034,274 A * | 7/1977 | Akima | 388/816 |
| 4,242,625 A * | 12/1980 | Hedges | 318/729 |
| 4,636,702 A * | 1/1987 | Hedges | 318/729 |
| 5,569,988 A | 10/1996 | Kokami et al. | 315/254 |
| 2004/0108827 A1 | 6/2004 | Kusaka et al. | 318/254 |

* cited by examiner

*Primary Examiner*—Karen Masih
(74) *Attorney, Agent, or Firm*—John L. Rogitz

(57) ABSTRACT

When a HDD is operating at a temperature below a threshold, a partial sine wave is input to the spindle motor to activate the motor to reduce undesirable speed oscillations of the motor. At normal operating temperatures a full sine wave is input for noise reduction.

8 Claims, 4 Drawing Sheets

SYSTEM AND METHOD FOR ESTABLISHING SPINDLE MOTOR CURRENT DURING COLD TEMPERATURE OPERATION OF HDD

I. FIELD OF THE INVENTION

The present invention relates generally to disk drives, and in particular to hard disk drives (HDD).

II. BACKGROUND OF THE INVENTION

Hitachi's U.S. Pat. No. 5,569,988, incorporated herein by reference, discloses a motor driving circuit for driving a three-phase brushless spindle motor of a hard disk drive (HDD). The disks of the HDD are rotated by the spindle motor. Variations on the Hitachi circuit may be found in USPP 2004/0108827, also incorporated herein by reference.

Feedback from the motor output has been used to establish a sinusoidal input current to the motor. In such an implementation, because the pattern of the three-phase output does not switch the current-supply pattern suddenly, but "softly" within predetermined phase criteria, it is colloquially referred to as a "soft switch".

In any case, the effect of such a control circuit is salutary, because it reduces the acoustic noise that is produced. As critically recognized herein, however, when the HDD is operating at relatively cold temperatures, such as at start-up, the soft switch feature can lead to undesirable speed oscillations of the spindle motor. With this critical recognition in mind, the invention herein is provided.

SUMMARY OF THE INVENTION

A controller chip for a hard disk drive having at least one disk rotated by a spindle motor includes logic that includes receiving a signal that varies with temperature. Based on the signal, it is determined whether to input a full sine wave drive current to the spindle motor.

As set forth in non-limiting implementations below, the signal may be a temperature signal, but more preferably is a spindle motor speed signal or a spindle motor current. A full sine wave drive current is input when the signal satisfies a threshold, and otherwise a partial sine wave drive current is input to the spindle motor. The partial sine wave includes a sinusoidal part and a non-sinusoidal part that may be part of a trapezoid.

In another aspect, a data storage device includes at least one storage disk, a spindle motor turning the disk, and a spindle driver supplying input drive current to the spindle motor. Means are provided for causing the driver to configure the drive current as a full sine wave under a first condition, and causing the driver to configure the drive current as a partial sine wave under a second condition.

In still another aspect, a disk drive includes a micro processor that establishes a spindle motor input current profile to be other than full sinusoidal when a signal received by the micro processor indicates that a temperature of the disk drive is below normal operating temperature, such that a phase detect window results that is relatively longer than it would be were a full sinusoidal profile to be used for the input current.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
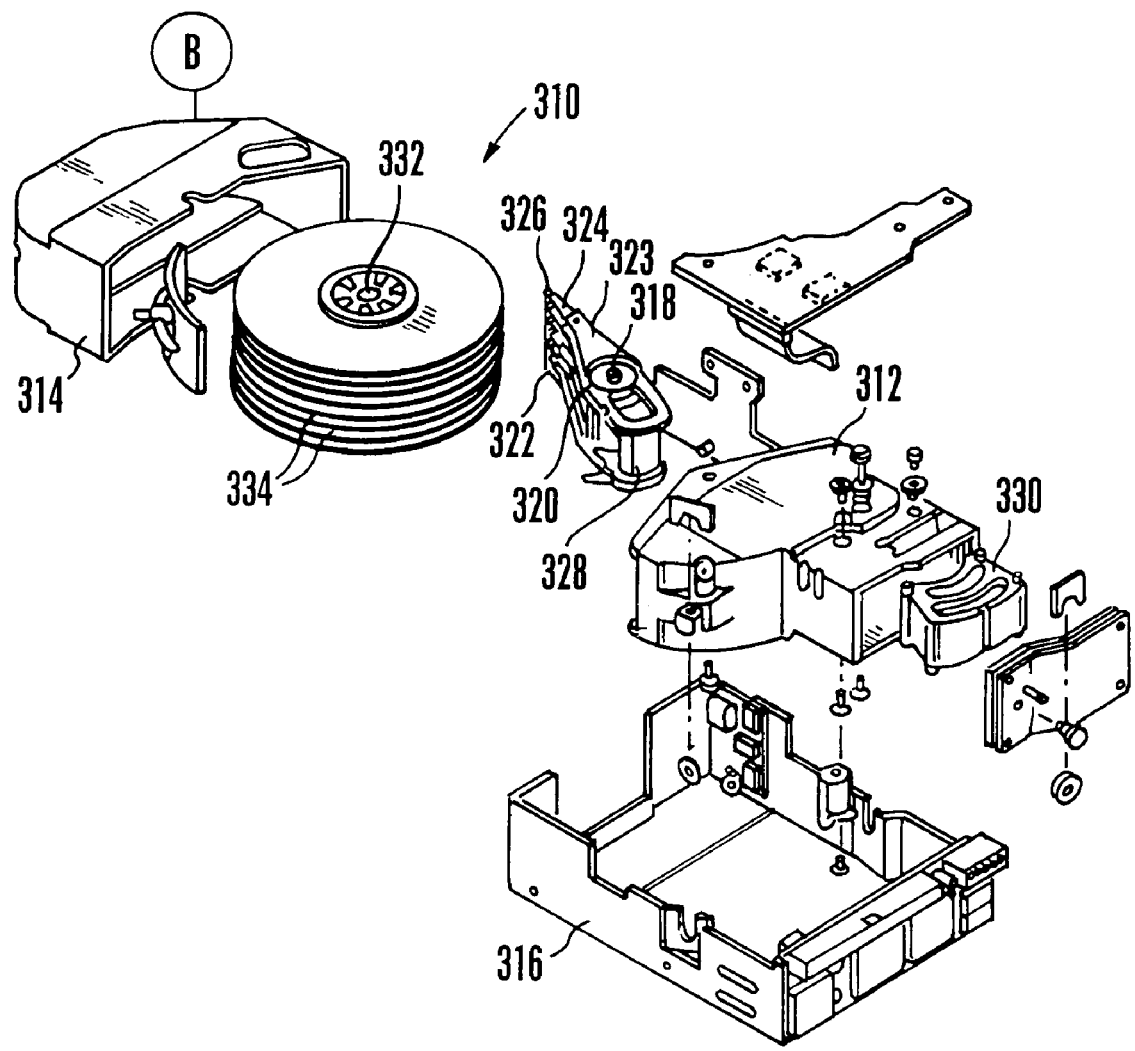
FIG. 1 is an exploded view of a non-limiting HDD implementation of the present invention.

Referring to FIG. 1 for a general overview of one non-limiting environment in which the present invention can be used, a rotary actuator is shown, although the invention described herein is also applicable to linear actuators.

A disk drive 310 includes a housing 312, and a housing cover 314 which, after assembly, is mounted within a frame 316. Rotatably attached within the housing 312 on an actuator shaft 318 is an actuator arm assembly 320. One end of the actuator arm assembly 320 may include an E block or comb like structure 322 having a plurality of actuator arms 323. Attached to the separate arms 323 on the comb or E block 322 are spring suspensions 324, and at the end of each spring suspension is a slider 326 which carries a magnetic transducer. On the other end of the actuator arm assembly 326 opposite the spring suspensions 324 and the sliders 326 is a voice coil 328.

Attached within the housing 312 are a pair of magnets 330. The pair of magnets 330 and the voice coil 328 apply a force to the actuator assembly 320 to rotate it about the actuator shaft 318. Also mounted within the housing 312 is a spindle shaft 332 that is rotated by the spindle motor shown in FIG. 2 and described below. The spindle shaft 332 rotates a number of disks 334. In FIG. 1 eight disks are attached to the spindle shaft 332. The disks 334 are attached to the spindle shaft 332 in spaced apart relation.

Figure 2:
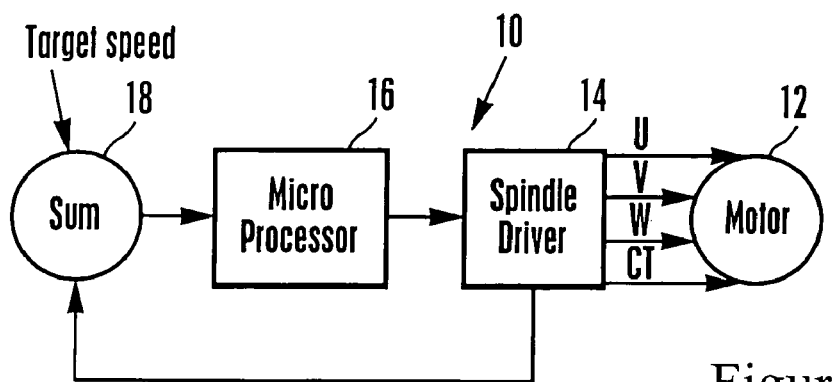
FIG. 2 is a block diagram showing the motor control circuitry.

Referring to FIG. 2 for further details, in a simplified embodiment a system 10 includes a spindle motor 12 that is coupled to the above-described spindle shaft. The motor 12 may be, e.g., a fluid-bearing three phase motor that receives "u", "v", and "w" input power to each of its respective three windings from a spindle driver 14. The spindle driver 14 also supplies a center tap signal "CT" to the center tap of the three phase Y-wound motor 12 as shown. The spindle driver 14 functions in cooperation with a control component, such as a micro processor 16, in accordance with the logic below. The micro processor 16 may be implemented by the HDD controller of the HDD or by another logic component within the HDD. In any case, as shown a summer 18 receives feedback (such as a motor pulse count rate) representing motor speed from the output of the spindle driver 14 and also receives a target speed, combining the two and sending input to the micro processor 16 for purposes to be shortly disclosed.

Figure 3:
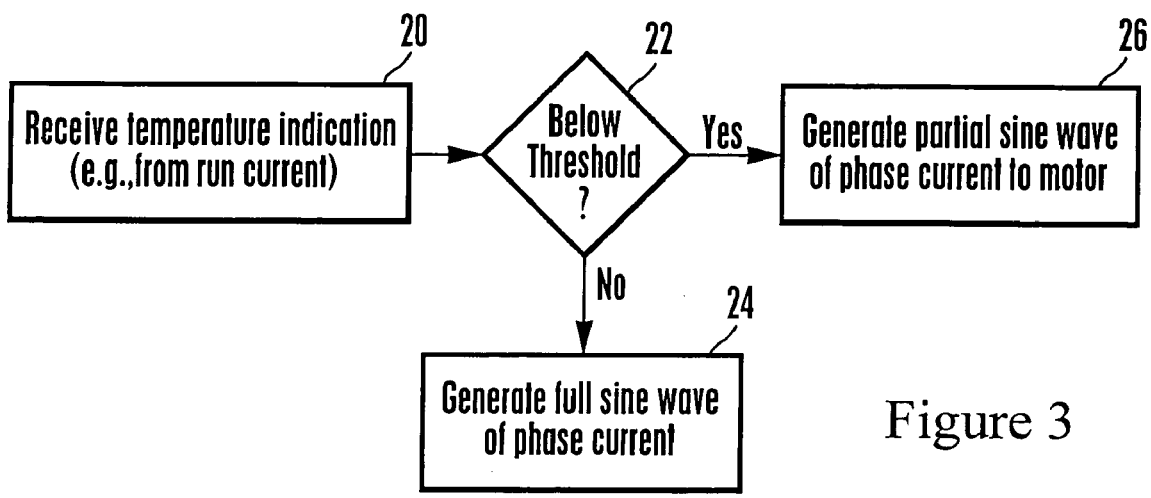
FIG. 3 is a flow chart of the logic.

Now referring to FIG. 3, the present logic may be seen. Commencing at block 20, an indication of temperature in the HDD is received. The indication may come directly from a temperature sensor in the housing of the HDD, but in one non-limiting implementation the temperature indication is a spindle motor control parameter which is affected by temperature. For instance, a control parameter such as the motor current from, e.g., a digital to analog converter (DAC) in the microprocessor can be received as an indication of temperature.

Proceeding to decision diamond 22, it is determined whether the signal violates a threshold. For example, by comparing the spindle control DAC value from the summer control 18 to a target threshold value, the micro processor 16 can determine whether the motor current (and, hence, temperature) violates an empirically determined threshold, e.g., 125% of desired current. If not, at block 24 the micro processor 16 signals the spindle driver 14 to generate a full sine wave input current to the appropriate winding of the motor 12, to reduce acoustic noise generated by the HDD. If, however, the comparison at decision diamond 22 indicates that the HDD is operating at low temperature, the logic flows to block 26 wherein the micro processor 16 signals the spindle driver 14 to generate a partial sine wave input current to the appropriate winding of the motor 12, to reduce speed oscillations of the spindle motor. By "partial sine wave" is meant that one temporal portion of the signal is a sine wave and another temporal portion of the signal (to the same winding) is something else, e.g., a portion of a trapezoidal wave that in any case produces in a larger temporal window for detecting the flyback signal than would otherwise be produced by a full sine wave.

Figure 4:
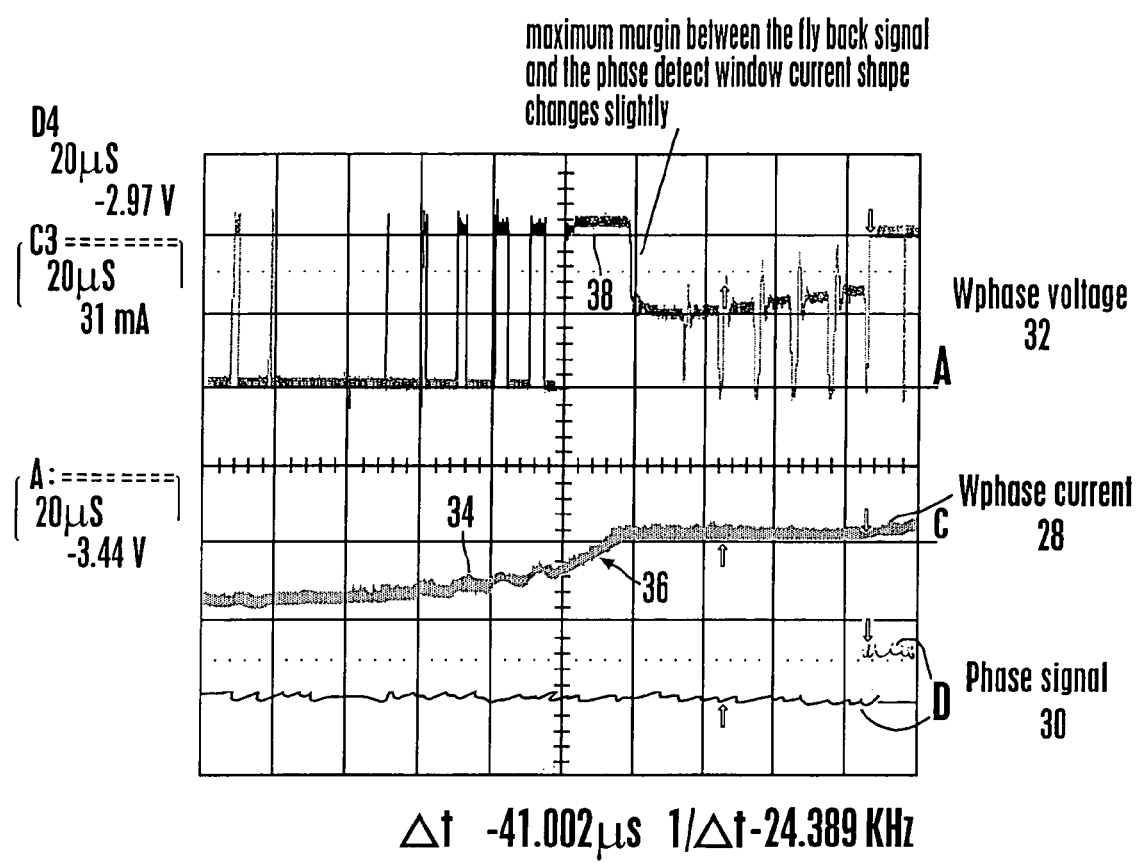
FIG. 4 is a non-limiting graph of various signals including the partial sine wave input current signal.
Figure 5:
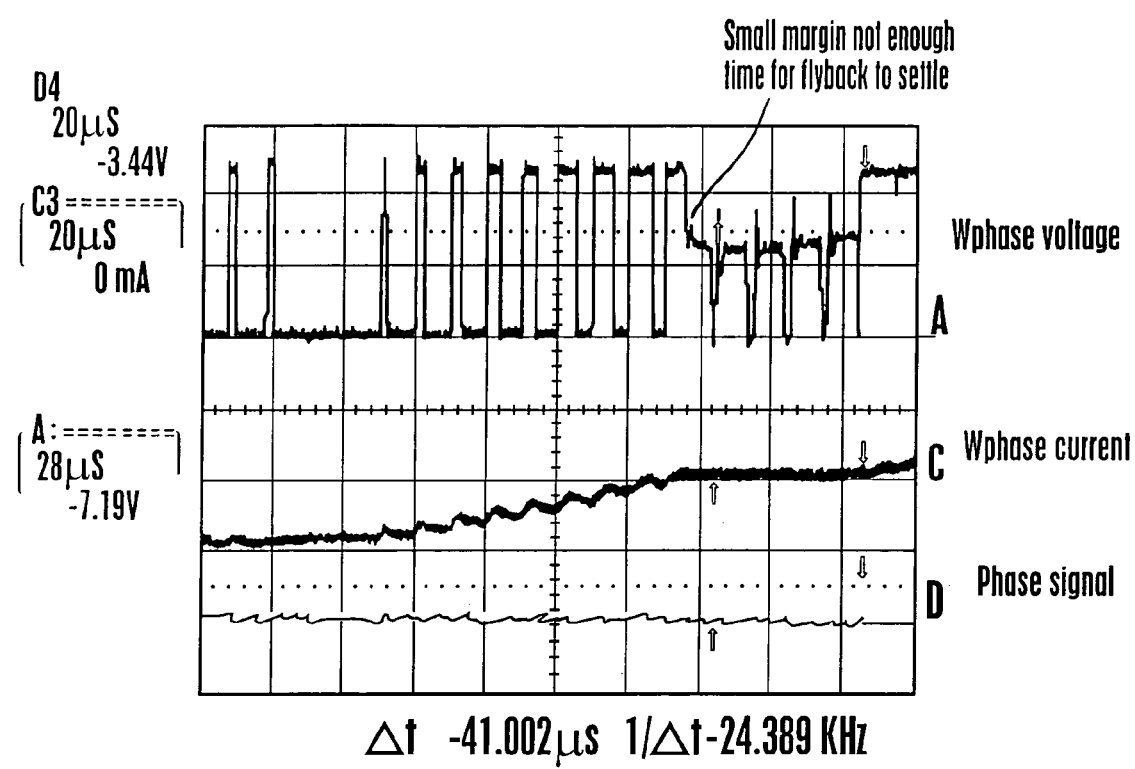
FIG. 5 is a non-limiting graph of various signals including a full sine wave.

FIG. 4 illustrates this in greater detail. In FIG. 4, current, represented by the curve 28, is the current flowing through the Wphase winding of the motor, scope CH "D" is the motion feedback signal associated with the Wphase windings for the example shown in FIG. 4 and is indicated at 30, while the scope CH "A" is Wphase voltage of the windings and is indicated at 32. As shown, a sinusoidal part 34 of the input current 28 is a sine wave, while a non-sinusoidal part 36 of the input current is, e.g., a portion of a trapezoid, i.e., can be a ramp. The relatively long phase detect window resulting from the generation of the non-sinusoidal part 36 is indicated at 38. Because of the larger window, errors in determining motor speed (and, hence, motor speed oscillations) are reduced. FIG. 5 presents a full sine wave to contrast with FIG. 4, and as indicated provides insufficient time at low temperatures for the flyback to settle.

While the particular SYSTEM AND METHOD FOR ESTABLISHING SPINDLE MOTOR CURRENT DURING COLD TEMPERATURE OPERATION OF HDD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A disk drive, comprising:
a micro processor establishing a spindle motor input current profile to be other than full sinusoidal when a signal received by the micro processor indicates that a temperature of the disk drive is below normal operating temperature such that a phase detect window results that is relatively longer than it would be were a full sinusoidal profile to be used for the input current.

2. The disk drive of claim 1, wherein because of the relatively larger detect window, errors in determining motor speed and, hence, motor speed oscillations are reduced.

3. The disk drive of claim 1, wherein the signal is a temperature signal.

4. The disk drive of claim 1, wherein the signal is a spindle motor speed signal or a spindle motor current signal.

5. The disk drive of claim 1, wherein a full sine wave drive current is established when the signal satisfies a threshold, and otherwise a partial sine wave drive current is established.

6. The disk drive of claim 5, wherein the partial sine wave includes a sinusoidal part and a non-sinusoidal part.

7. The disk drive of claim 6, wherein the non-sinusoidal part is at least part of a trapezoid.

8. The disk drive of claim 1, comprising a spindle driver receiving commands from the micro processor and in response generating the drive current to a spindle motor rotating data storage disks.

* * * * *